United States Patent [19]  
Katz et al.

[11] 4,080,871  
[45] Mar. 28, 1978

[54] PRESSURE MEDIUM SERVO MOTOR, ESPECIALLY FOR SERVO STEERING SYSTEMS

[75] Inventors: Klaus Katz, Stuttgart; Jaromir Bordovsky, Berglen-Hosslinswart, both of Germany

[73] Assignee: Daimler-Benz Aktiengesellschaft, Germany

[21] Appl. No.: 649,807

[22] Filed: Jan. 16, 1976

[30] Foreign Application Priority Data

Jan. 17, 1975 Germany .............................. 2501751

[51] Int. Cl.² ............................................. F15B 15/17
[52] U.S. Cl. ................................. 91/417 R; 91/165; 92/6 R; 92/108; 92/136
[58] Field of Search .................. 92/6 R, 108, 33, 62, 92/136; 91/434, 166, 165, 417 R, 417 A; 60/574, 577

[56] References Cited

U.S. PATENT DOCUMENTS

| | | | |
|---|---|---|---|
| 1,958,511 | 5/1934 | Dodge | 60/577 |
| 2,434,296 | 1/1948 | Swanson | 92/6 R |
| 2,858,805 | 11/1958 | Lincoln | 91/434 |
| 3,153,522 | 10/1964 | Piper | 92/62 |
| 3,312,146 | 4/1967 | Quéré | 92/62 |
| 3,511,133 | 5/1970 | Day | 92/108 |
| 3,677,005 | 7/1972 | Estlick | 92/6 R |
| 3,687,014 | 8/1972 | Forster | 92/33 |
| 3,719,124 | 3/1973 | Katz et al. | 91/434 |
| 3,908,373 | 9/1975 | Peterson | 91/165 |
| 3,972,266 | 8/1976 | Strauff | 91/417 R |

FOREIGN PATENT DOCUMENTS 2,133,893 1/1972 Germany .............................. 92/62

Primary Examiner—Martin P. Schwadron  
Assistant Examiner—Abraham Hershkovitz  
Attorney, Agent, or Firm—Craig & Antonelli

[57] ABSTRACT

A pressure medium servo-motor, especially for servo-steering systems, in which a working piston operating in a working cylinder is provided with a piston pressure surface actuatable by the pressure in one working pressure chamber of the working cylinder for producing a servo-force directed in the sense of the relative movement of the working piston with respect to the working cylinder; the piston pressure surface of the working piston is thereby reduced with respect to the reference value fulfilling the equilibrium condition of the piston pressure forces in the neutral position of the working piston, by a reducing piston which includes a pressure disengaging surface actuatable by the pressure in the working pressure chamber and a relief pressure surface actuatable by the pressure in a relief pressure chamber.

24 Claims, 3 Drawing Figures

PRESSURE MEDIUM SERVO MOTOR, ESPECIALLY FOR SERVO STEERING SYSTEMS

The present invention relates to a pressure medium servo-motor especially for servo-steering systems, in which a working piston operating in a working cylinder includes a piston pressure surface that is adapted to be acted upon by the pressure in one working pressure chamber of the working cylinder, for purposes of producing a servo-force directed in one directional sense of the relative movability of the working piston with respect to the working cylinder.

In servo-motors of this type, the return of the working piston into its neutral rest position may be impaired, for example, by frictional resistances of the parts movable relative to one another. Frictional resistances are specially troublesome above all, when the servo-motor operates with high operating pressures and a rapid return of the working piston is desirable since the friction resistances become larger with increasing operating pressures.

The task underlying the present invention essentially resides in facilitating the return movement of the working piston into its neutral rest position.

The described task is solved according to the present invention in that the piston pressure surface is reduced with respect to the reference value fulfilling the equilibrium condition of the piston pressure forces in the neutral rest position of the working piston, by a reducing piston arranged in a relatively movable as also in a pressure-tight manner with respect to the working piston and working cylinder, whereby the reducing piston includes a pressure disengaging surface directed in the same direction as the piston pressure surface and actuatable by the pressure of the working pressure chamber and a relief pressure surface directed in the opposite direction and actuatable by the pressure of a relief pressure chamber, as well as is immovably supported by means of abutment and corresponding counter-abutment means, on the one hand, relative to the working piston in the piston positions of the working piston reducing the chamber volume of the working pressure chamber with respect to the starting or initial volume associated with the rest position of the working piston and, on the other, relative to the working cylinder in the piston positions of the working piston increasing the chamber volume. In the servo-motor according to the present invention, for the working stroke only the reducing piston pressure surface is effective whereas for the return movement of the working piston both the reducing piston pressure surface as also the pressure disengaging surface are effective. The present invention is of advantage especially with such servo-motors, in which a pressure storage device or tank is used as pressure source and in which accordingly high equilibrium pressures corresponding to the ratio of the piston pressure surfaces are established within the working pressure chambers in the neutral rest position of the working piston. In the servo-motors controlled according to the through-flow principle, a certain pre-control pressure is required in the working pressure chambers in the neutral rest position of the working piston.

In the application of the present invention to servo-steering systems, also the handling ability and control thereof are improved since with these types of servo-steering systems the working piston, for safety reasons, and the valve-adjusting member of the control valve adjusting the pressure in the working pressure chambers, for the selective control at will, are constantly gearingly coupled with the steering wheel. An improved return movement of the working piston therefore produces necessarily also an improved return of steering wheel and of the valve-adjusting member. Servo-steering systems operate customarily with reaction pressure surfaces acting back on the steering wheel in order to let a steering hand force become effective which is dependent on the working pressure of the servo-motor. By means of the reaction pressure surfaces the sponginess during the steering wheel actuation which has been frequently noticeable heretofore in the center steering wheel positions is eliminated by the present invention; for an increased initial or starting pressure is necessary in the corresponding working pressure chamber by reason of the reduction of the piston pressure surface by the reducing piston in order to displace the working piston out of its rest position. This increased starting pressure, however, produces an improved steering feel.

The servo-motor according to the present invention may be so constructed that a reducing plunger piston which extends through a working pressure chamber and is arranged parallel as also eccentric to the axis of the working piston is displaceably inserted with its one end into a pressure-relieved cylinder chamber of the working piston and with its other end into a cylinder chamber of the working cylinder connected with the working pressure chamber.

The structural expenditure for a cylinder chamber connected with the working pressure chamber in the working cylinder is avoided in an advantageous construction of the servo-motor according to the present invention in that the one end face of an annular reducing piston arranged coaxially to the axis of the working piston is disposed in the working pressure chamber of the reduced piston pressure surface and the one cylindrical outer surface of the annular reducing piston is sealed off with respect to the working piston and the other cylindrical outer surface of the annular reducing piston is sealed off with respect to the working cylinder.

If one constructs the servo-motor according to the present invention in such a manner that the value of the reduced piston pressure surface increased by the value of the pressure disengaging surface is equal to the reference value of the piston pressure surface fulfilling the equilibrium condition of the piston pressure forces in the neutral rest position of the working piston, then one reducing piston each is required for the two piston pressure surfaces in connection with double-acting working pistons.

However, the arrangement according to the present invention may also be so made in an advantageous manner that the value of the reduced piston pressure surface increased by the value of the pressure disengaging surface is larger than the reference value of the reduced piston pressure surface fulfilling the equilibrium condition of the piston pressure forces in the neutral rest position of the working piston. In this manner, a return or repositioning effect is achieved by means of a single reducing piston also for the other, non-reduced piston pressure surface of the working piston, whence the structural length of the servo-motor is reduced by half a piston stroke as compared to a servo-motor with two reducing pistons.

It is necessary, for example, in servo-steering systems that the working piston cooperates with a spindle or the like extending into the working cylinder coaxially to the piston axis. It is advantageous thereby for the seal of the corresponding opening in the working cylinder with respect to the adjoining working pressure chamber if the working piston cooperates with a sealing surface that is immovable with respect to the working cylinder. In order to achieve such an immovable sealing surface, the servo-motor may be provided with a sealing sleeve arranged coaxially to the axis of the working piston in the interior space of the working cylinder, which sealing sleeve is essentially immovably fixed with its one end at the end wall of the working cylinder having an opening and which seals off in a pressure-tight manner the opening with respect to the working pressure chamber adjoining the end wall. If in application of the present invention to such a servo-motor one provides a reducing ring piston that is effective for both piston pressure surfaces, at the piston pressure surface opposite the end face with the opening, then one may obtain a structural length for the working piston increased by an entire piston stroke.

If the arrangement is made in an advantageous construction according to the present invention in such a manner that the disengaging pressure surface is located in the working pressure chamber adjoining the end wall having the opening, then the increase of the structural length possibly necessitated by the reducing piston is limited to half a piston stroke.

If one arranges the reducing ring piston radially between the working cylinder and the working piston, then in particular with servo-steering systems difficulties may arise especially with respect to the maintenance of a short structural length if the control valve actuated by the steering spindle is supported in the wall.

In an advantageous embodiment of the servo-motor according to the present invention, provision is made that the reducing piston is arranged radially between the sealing sleeve and the working piston in relation to the axis of the working piston. As a result of this arrangement, the annular reducing piston or pistons may also be constructed and designed with a very small cross section, whence the power loss can be kept small.

In double-acting servo-motors having a control according to the through-flow principle, with the use of a double-acting reducing piston for both piston pressure surfaces of the working piston which are of equal size, as such, a radial overlap between the disengaging pressure surface of the reducing piston, actuatable by the pressure of the one working pressure chamber, and the piston pressure surface of the working piston actuatable by the pressure of the other working pressure chamber, is required, which is structurally realizable by means of diametric offsets or steps either of the working cylinder or of the working piston. However, a structural length for the servo-motor increased by half a piston stroke is required by this diametric offset since the narrow section of the stepped part and the reducing piston larger in the outer diameter must be disposed one behind the other in the direction of the piston axis.

For purposes of avoiding the increase of the structural length explained hereinabove, it is additionally proposed that the disengaging pressure surface actuatable by the pressure of the one working pressure chamber and the piston pressure surface of the working piston actuatable by the pressure of the other working pressure chamber, do not overlap in the radial direction of the axis of the working piston and in the neutral rest position of the working piston the pressure actuating the disengaging pressure surface is lower than the pressure of the other working pressure chamber. Such a servo-motor operates with the storage or reservoir tank pressure which actuates the smaller piston pressure surface.

In application of the last-mentioned proposal to a prior art servo-motor of a servo-steering system with a pressure-relieved gear chamber of the working cylinder, which is disposed opposite to the end wall having the opening, for the gearing connection of the working piston with an adjusting shaft, in which the gear chamber is subdivided in a pressure-tight manner with respect to the working pressure chamber disposed opposite the end wall having the opening, by means of a partition wall that is fixed relative to the working cylinder and cooperates with the working piston, and with respect to the other working pressure chamber by means of the sealing sleeve, the arrangement may be made according to the present invention in a simple, advantageous manner such that the pressure relief surface of the reducing piston is located in the gear chamber.

Accordingly, it is an object of the present invention to provide a pressure medium servo-motor, especially for servo-steering systems which avoids by simple means the aforementioned shortcomings and drawbacks encountered in the prior art.

Another object of the present invention resides in a pressure medium servo-motor for servo-steering systems in which the return of the working piston into its neutral, rest position is facilitated, notwithstanding the use of relatively high operating pressures.

A further object of the present invention resides in a pressure medium servo-motor for servo-steering systems whose handling ability and control is improved while at the same time an improved return of the working piston into its neutral position is assured thereby.

Still a further object of the present invention resides in a pressure medium servo-motor especially for servo-steering systems which eliminates the sponginess encountered frequently in the steering wheel actuation which is noticeable especially in center steering wheel positions.

Still another object of the present invention resides in a servo-motor for servo-steering systems which produces an improved steering feel for the driver.

Another object of the present invention resides in a pressure medium servo-motor especially for servo-steering systems in which the structural expenditures are minimized and the structural length thereof can be reduced in an advantageous manner.

A further object of the present invention resides in a pressure medium servo-motor especially for servo-steering systems in which a reliable seal is achieved between the various parts and power losses can be minimized.

These and other objects, features and advantages of the present invention will become more apparent from the following description when taken in connection with the accompanying drawing which shows, for purposes of illustration only, one embodiment in accordance with the present invention, and wherein.

Figure 1:
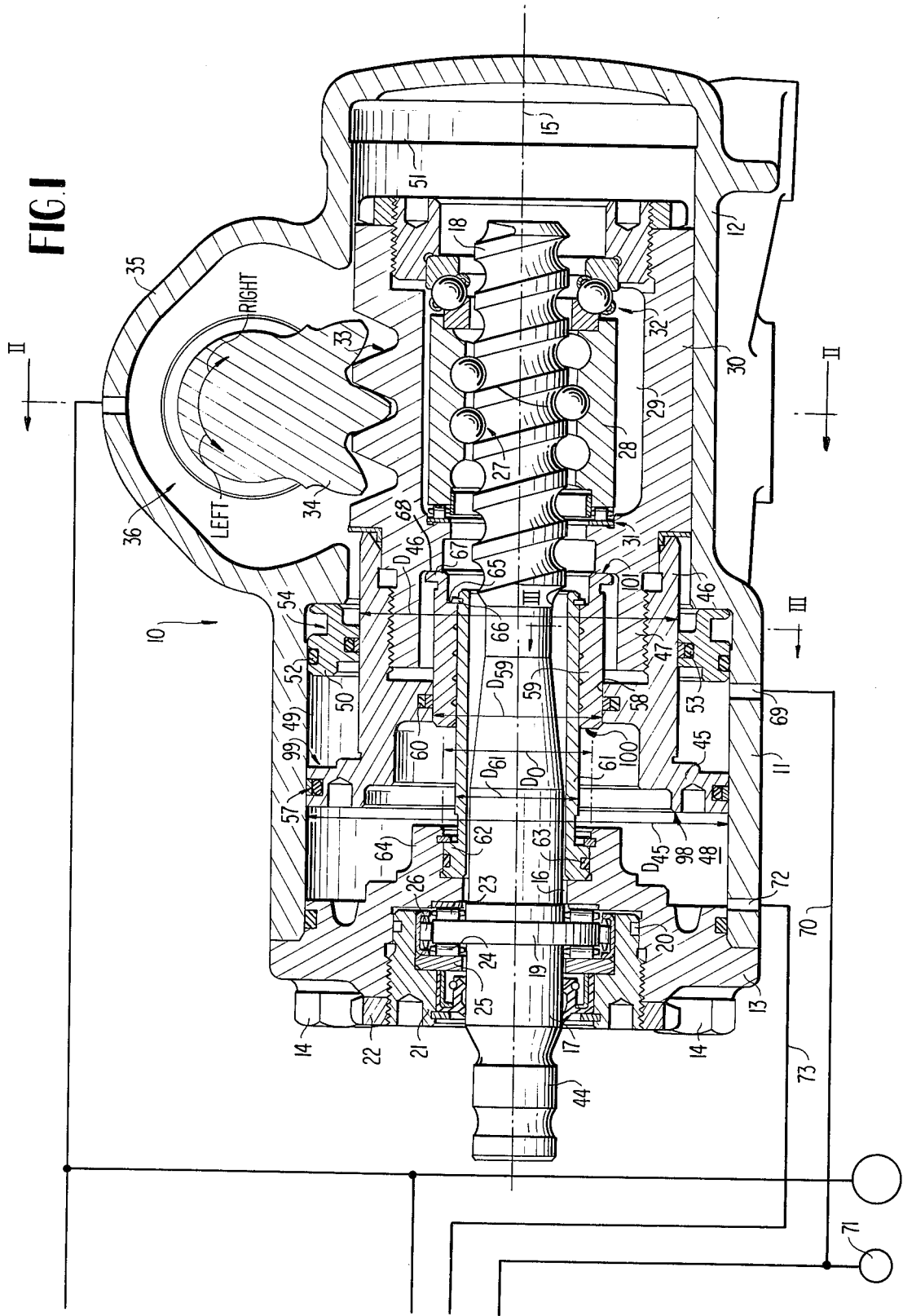
FIG. 1 is an axial cross-sectional view, containing the axis of the working piston and steering worm, through the steering gear housing of the servo-steering system according to the present invention, taken along line I—I in FIG. 2.

Referring now to the drawing wherein like reference numerals are used throughout the various views to designate like parts and more particularly to FIG. 1, an essentially pot-shaped steering gear housing generally designated by reference numeral 10 consists of a diametrically wide working cylinder portion 11 and of a diametrically narrower guide portion 12 which is coaxial with the working cylinder portion 11 and in one piece therewith. The end of the working cylinder portion 11 which is open as such is closed off in a pressure-tight manner by a housing end cover 13 which is detachably secured at the working cylinder portion 11 by means of bolts 14. The housing end cover 13 includes an opening 16 which is coaxial to the housing longitudinal axis 15 of the steering gear housing 10, for the passage therethrough of a steering spindle portion 17 which at its housing inner end is made in one piece with a coaxial steering worm 18. A bearing flange or collar 19 of the steering spindle portion 17, which is enlarged in diameter, is disposed in a recess 20 machined into end face of the housing end cover 13 on the housing outer side and coaxial to the axis 15, into which is screwed a bearing adjusting ring 21 also coaxial to the axis 15 which is secured against loosening by a lock-nut or counter-nut 22. The steering spindle portion 17 and therewith also the steering worm 18 are rotatably but axially and radially essentially immovably supported in the steering gear housing 10 by way of the bearing flange or collar 19. For this purpose, the bearing flange 19 is supported in the one direction of the housing axis 15 against the housing end cover 13 by way of an axial roller bearing 23 and in the opposite direction at the bearing adjusting ring 21 by way of a further axial roller bearing 24 as well as a gland washer or bearing disk 25. Perpendicularly to the housing axis 15 the bearing flange or collar 19 is immovably fixed with respect to the working cylinder portion 11 by a radial roller bearing 26 arranged at its cylindrical outer surface.

Figure 2:
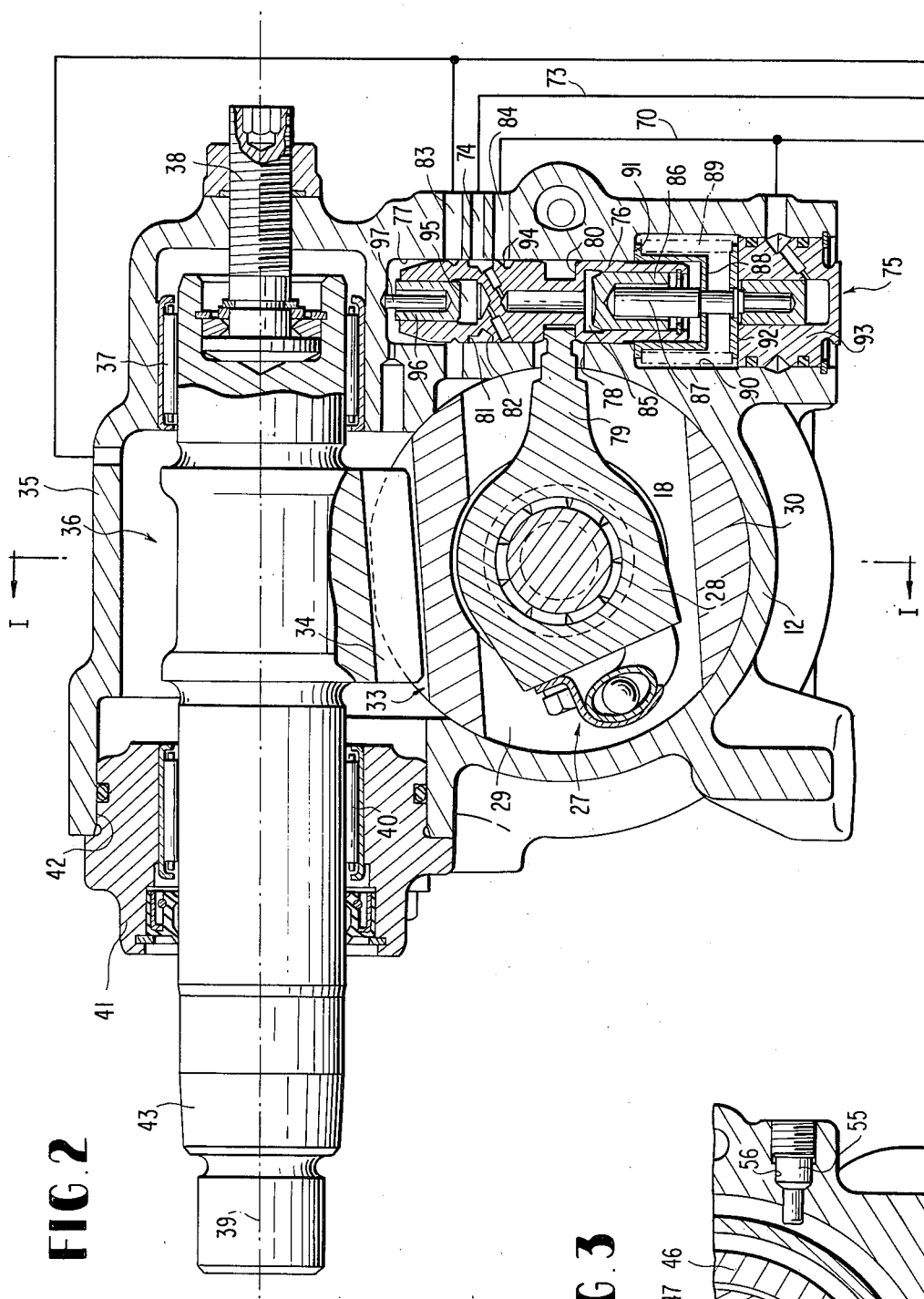
FIG. 2 is a cross-sectional view through the steering gear housing in a plane perpendicular to the axis of the working piston and steering worm, taken along line II—II in FIG. 1.

The steering worm 18 is spirally movably connected by means of a ball circulation generally designated by reference numeral 27 with a steering nut 28 which is rotatably but axially non-displaceably supported in a radial aperture or recess 29 of a guide piston portion 30 by means of two bearing arrangements generally designated by reference numerals 31 and 32. The guide piston portion 30 is axially displaceably and radially essentially immovably supported in the steering gear housing 10 by the guide portion 12 and is provided at its outer circumference with a toothed rack profile generally designated by reference numeral 33, into which engages a toothed segment 34 of a steering shaft generally designated by reference numeral 36 rotatably supported in a housing bulge 35 of the guide portion 12. The housing inner end of the steering shaft 36 is supported in the housing bulge 35 by a radial roller bearing 37 (FIG. 2), and a tooth-play clearance adjusting bolt 38 connected with this shaft end fixes the position of the steering shaft 36 in the directions of its axis 39 with respect to the steering gear housing 10. The shaft section of the steering shaft 36 adjoining the toothed segment 34 on the other side is supported by a radial roller bearing 40 in a bearing eye 41 (FIG. 2) which closes off an end face assembly opening 42 of the housing bulge 35 for the insertion of the steering shaft 36. The housing outer end of the steering shaft 36 is provided with a fastening pin 43, to which the steering linkage connected with the steerable vehicle wheels is adapted to be pivotally connected.

The housing outer end of the steering spindle portion 17 is provided with a coupling pin 44 (FIG. 1), by way of which the steering spindle 17 and therewith the steering wheel can be non-rotatably connected with the steering worm 18.

With reference to FIG. 1, the steering shaft 36 is rotated in the clockwise direction by a right deflection of the steering spindle part 17.

Figure 3:
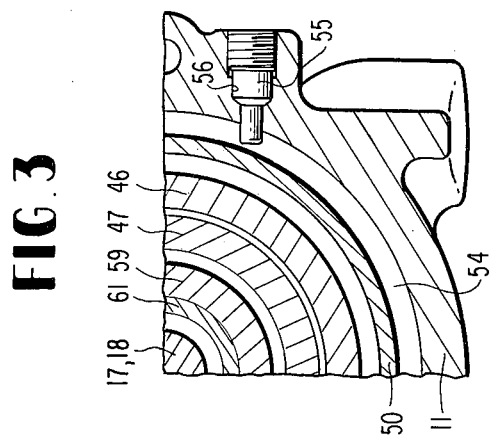
FIG. 3 is a partial cross-sectional view through the steering gear housing in a plane perpendicular to the axis of the working piston and steering worm, taken along line III—III in FIG. 1.

A ring-shaped differential working piston 45 operating in the working cylinder portion 11 serves for the assist of the steering torque applied manually at the steering spindle portion 17 for purposes of the adjustment of the toothed segment 34. The differential working piston 45 is thereby provided with an axial sealing flange 46 which is securely threadably connected with a threaded flange 47 of the guide piston portion 30 provided at the end face. The working piston 45 subdivides the interior space of the working cylinder portion 11 into a working pressure chamber 48 having a relatively large annular cross section and into a working pressure chamber 49 with a relatively small annular cross section. The small working pressure chamber 49 is separated off in a pressure-tight manner with respect to a pressure-relieved gear chamber 51 of the steering gear housing 10 by means of a housing ring 50 inserted into the working cylinder portion 11 whereby the housing ring 50 is sealed off by way of a radially outer sealing ring 52 with respect to the working cylinder portion 11 and by a radially inner sealing ring packing or gland 53 with respect to the sealing flange 46. The housing ring 50 is provided at its circumference with a circumferential groove 54 into which engages a locking or stopping bolt 55 (FIG. 3) which is screwed into a housing opening 56 of the working cylinder portion 11 and fixes the housing ring 50 in one direction of the housing axis 15.

The working pressure chambers 48 and 49 are sealed off in a pressure-tight manner with respect to one another by a radially outer sealing ring packing or gland 57 of the working piston 45 which cooperates with the working cylinder portion 11. The coaxial bore 58 of the working piston 45 is traversed by a reducing piston 59 whereby a sealing ring packing or gland 60 of the working piston 45 seals off the latter pressure-tight with respect to the reducing piston 59. The reducing piston 59 is arranged pressure-tight and in a sliding manner on a sealing sleeve 61 which surrounds the steering spindle portion 17 with radial play and at its one end subdivides the opening 16 in a pressure-tight manner with respect to the adjoining working pressure chamber 48 by means of a collar or flange 62 and an annular seal 63. The collar or flange 62 is fixed both radially as also in the directions of the housing axis 15 with respect to the steering gear housing 10 by a corresponding annular socket portion 64 of the housing end cover 13. Since the corresponding slide surfaces of the reducing piston 59 and of the sealing sleeve 61 form a pressure-tight seal, the working pressure chamber 48 is also separated off pressure-tight with respect to the gear chamber 51 by means of the sealing sleeve 61.

In the illustrated neutral position of the working piston 45 for the straight drive, the reducing ring piston 59 is fixedly supported in the direction of its piston longitudinal axis coinciding with the housing axis, opposite to the coupling pin 44, both by means of an abutment surface 65 at a counter-abutment ring 66 of the sealing sleeve 61 which is immovable relative to the steering gear housing 10, as also by means of an abutment collar 67 at a counter-abutment surface 68 of the guide piston portion 30 which is immovable relative to the working piston 45.

The common outer diameter of the two piston pressure surfaces of the working piston 45 is designated by $D_{45}$. The inner diameter of the larger piston pressure surface is designated by $D_{59}$ and the inner diameter of the smaller piston pressure surface of the working piston 45 is designated by $D_{46}$. A theoretical reference value for the inner diameter of the larger piston pressure surface of the working piston 45 is designated by $D_0$ whereas the inner diameter of the reducing piston 59 is designated by $D_{61}$.

The smaller working pressure chamber 49 includes a chamber connection indicated in FIG. 1 by reference numeral 69, which is connected by way of a housing channel schematically indicated at 70 with a high-pressure line 71 connected to a high pressure tank or reservoir of conventional type. The pressure in the smaller working pressure chamber 49 is thus essentially equally large for all stroke positions of the working piston 45.

The larger working pressure chamber 48 includes a chamber connection indicated at 72 (FIG. 1) which is connected by way of a housing channel schematically indicated at 73 with the control valve connection 74 (FIG. 2) of a control slide valve generally designated by reference numeral 75 which operates according to the principle of the two-edge control and is structurally integrated into the wall of the guide portion 12 of the steering gear housing 10.

The control slide member 76 of the control valve 75 is axially displaceably seated in a housing bore 77 of the guide portion 12, which is connected with the gear chamber 51 by way of a wall aperture or opening 78. The wall opening 78 is traversed by a control arm 79 formed in one piece with the steering nut 28, which engages form-lockingly, yet pivotally in an annular groove 80 provided at the circumference of the control slide member 76.

In the illustrated neutral position of the control slide member 76 for straight drive, the valve connection 74 of the larger working pressure chamber 48 is closed off with respect to two adjacent valve connections 83 and 84 by two control edges 81 and 82 enclosing therebetween a further annular groove provided at the circumference of the control slide member 76.

The further annular groove of the control slide member 76 enclosed by the control edges 81 and 82 is in constant communication both by way of the valve connection 74 with the larger working pressure chamber 48 as also by way of a control slide member bore with a wide reaction pressure chamber 85 provided in the control slide member 76. A wide reaction piston 86 is axially displaceably inserted into the reaction pressure chamber 85, which in one direction of its longitudinal axis is supported at a prestressed reaction spring 89 by way of a bolt 87 and a pot-shaped spring-disk or spring-plate 88. The prestress of the reaction spring 89 arranged in a section 90 of the housing bore 77 which is enlarged in its diameter is absorbed at the spring end associated with the pot-shaped spring plate 88 by a housing abutment surface 91 and at the other spring end by a closure plug 93 by way of a disk-shaped spring plate 92. The closure plug 93 is seated in the section 90 pressure-tight and immovably with respect to the guide portion 12 and closes off toward the outside the end opening of the housing bore 77 constructed as dead-end bore.

A further annular groove 94 provided at the circumference of the control slide member 76 is in continuous communication with the valve connection 84 as also by way of a control slide member bore with a narrow reaction pressure chamber 95 of the control slide member 76. A reaction piston 96 is inserted pressure-tight and axially displaceably into the reaction pressure chamber 95; the reaction piston 96 is thereby rigidly supported continuously with respect to the guide portion 12 by means of a bolt 97.

The reaction piston 86 is responsible for a reaction pressure force occurring at the control slide member 76, which is directed opposite to the movement of the control slide member 76 corresponding to a left deflection of the steering wheel. The reaction piston 96 is responsible for a reaction pressure force occurring at the control slide member 76 which is directed opposite to the movement of the control slide member 76 corresponding to a right deflection of the steering wheel. The effective piston pressure surfaces or areas of the two reaction pistons 86 and 96 are so matched to one another that the two reaction pressure forces cancel one another in the center position of the control slide member 76 and in the other positions of the control slide member form a reaction differential pressure force which is directed opposite to the movement of the control slide member 76 as also proportional to the differential pressure force of the working piston 45. The proportional dependency of the reaction differential pressure force, however, remains preserved only as long as the prestress of the reaction spring 89 suffices in order to support the reaction piston 86 rigidly against the housing. The operating range of the reaction piston 86 adjoining the proportionality range is without significance for an understanding of the present invention and has been described in detail in the prior German Patent Application No. P 2405,561.6.

The equilibrium pressure which is established in the working pressure chamber 48 by the control valve 75 in the center stroke position of the working piston 45, is so large that the piston pressure force resulting from this equilibrium pressure and the reference value $(D^2_{45} - D^2_0)(\pi/4)$ of the larger piston pressure area 98 (FIG. 1) of the working piston 45 maintains an equilibrium to the piston pressure force resulting from the smaller piston pressure area 99 of the working piston 45 and the storage or tank pressure of the smaller working pressure chamber 49.

According to the present invention, the reference value $(D^2_{45} - D^2_0)(\pi/4)$ of the piston pressure surface 98 is reduced by the reducing ring piston 59 by the amount of $(D^2_{59} - D^2_0)(\pi/4)$. As a result thereof, a somewhat increased starting pressure is required in the working pressure chamber 48 for the left deflection of the steering shaft 36 in order to displace the working piston 45 out of its center stroke position. This increased starting pressure has as a consequence an increased reaction differential pressure force at the control slide member 76 which produces a better steering feel in the center position of the steering wheel. The reducing piston 59 remains during the left deflection of the steering shaft 36 in its abutment position at the retaining ring 66 whereas the counter-abutment surface 68 of the guide piston portion 30 moves away from the abutment collar 67 of the reducing piston 59. During the return of the working piston 45, only the reduced value $(D^2_{45} - D^2_{59})$ $(\pi/4)$ of the piston pressure surface 98 therefore remains effective as restraining pressure area so that the differential pressure force at the working piston 45 which assists the return is increased.

Whereas the end-face pressure disengaging surface of the reducing piston 59 which is disposed in the larger working pressure chamber 48 and which in its pressure effect on the working piston 45 is disengageable by the retaining ring 66, is designated by reference numeral 100 (FIG. 1), the end-face relief pressure surface of the reducing ring piston 59 which is of the same size and is disposed in the pressure-relieved gear chamber 51 is designated by reference numeral 101.

In order to achieve by means of the reducing ring piston 59 also an improved return of the working piston 45 after a right deflection of the steering shaft 36, the diameter $D_{61}$ is designed smaller than the reference diameter $D_0$. As a result thereof, the sum of the piston pressure area 98 having a size $(D^2_{45} - D^2_{59})$ $(\pi/4)$ and of the pressure disengaging surface 100 having a size $(D^2_{59} - D^2_{61})$ $(\pi/4)$ is larger than the reference value $(D^2_{45} - D^2_0)$ $(\pi/4)$ of the piston pressure surface 98 for the equilibrium condition. Since the annular reducing piston 59 is rigidly connected with the working piston 45 by the abutment means 67 and 68 in case of a right deflection of the steering shaft 36, the starting pressure in the working pressure chamber 48 during the movement of the working piston 45 out of its equilibrium position must be lower by an amount dependent on the difference area $(D^2_0 - D^2_{61})$ $(\pi/4)$, in order to obtain an equal differential pressure force at the working piston 45 as obtained by the reference area $(D^2_{45} - D^2_0)$ $(\pi/4)$. This lower starting pressure produces a higher reaction differential pressure force at the control slide member 76 also for the right-hand deflection of the steering wheel. During the return of the working piston 45, after a completed right deflection, the pressure disengaging surface 100 and the piston pressure surface act in an assisting manner whereby the area component $(D^2_0 - D^2_{61})$ $(\pi/4)$ of the pressure disengaging surface 100 provides an additional return pressure force at the working piston 45.

While we have shown and described only one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A pressure medium servo-motor comprising: working cylinder means,
working piston means movably disposed in said working cylinder means, said working piston means exhibiting oppositely directed first and second working piston pressure surfaces which are acted on by respective first and second pressure mediums in respective first and second working cylinder pressure chambers, said working piston means being movable from a neutral rest position in a first direction with the aid of first predetermined pressure conditions in said working pressure chambers and being movable from said neutral rest position in a second opposite direction with the aid of second predetermined pressure conditions in said working pressure chambers,
and reducing piston means positioned radially inwardly of the working piston means in an annular space delimited in the radial outward direction by the working piston means and in the radial inward direction by a sealing sleeve means fixed to said working cylinder means, said reducing piston means being movable with respect to said working piston means and being configured and disposed to change the effective area of at least one of said first and second pressure surfaces in dependence on the direction of movement of said working piston means, whereby return movement of the working piston means to said rest position is facilitated.

2. A pressure medium servo-motor according to claim 1, characterized by abutment means and corresponding counter-abutment means for supporting the reducing piston means in an essentially immovable manner with respect to the working piston means when the working piston means is moved in said first direction toward said first working pressure chamber from the rest position of the working piston means to reduce the volume of said first working pressure chamber.

3. A servo-motor according to claim 1, characterized in that the reducing piston means is an annular reducing piston means arranged essentially coaxially to the axis of the working piston means, an end face forming a pressure-disengaging surface means of the reducing piston means being disposed in the first working pressure chamber means, one of the surfaces of the reducing piston means being sealed with respect to the working piston means and the other being sealed with respect to the sealing sleeve means.

4. A servo-motor according to claim 1, characterized in that the sum of the areas of the effective reduced first working piston pressure surface and the pressure disengaging surface is larger than a reference area of the reduced piston pressure surface means which would result in an equilibrium condition of the piston pressure forces in the neutral rest position of the working piston means.

5. A servo-motor according to claim 1, with said sealing sleeve means arranged in the interior space of the working cylinder means substantially coaxially to the axis of the working piston means, said sealing sleeve means having one end fixed in an essentially immovable manner at an end wall of the working cylinder means having an opening and which seals off said opening pressure-tight with respect to the working pressure chamber adjoining said end wall, characterized in that the disengaging pressure surface means is located in the working pressure chamber adjoining the end wall having the opening.

6. A servo-motor according to claim 5, characterized in that said end wall is formed by a housing end cover.

7. A servo-motor according to claim 1, characterized in that disengaging pressure surface means actuatable by the pressure of the first working pressure chamber and the piston pressure surface of the working piston means actuatable by the pressure of the second working pressure chamber include portions spaced from one another in the radial direction of the axis of the working piston means.

8. A servo-motor according to claim 7, characterized in that the pressure actuating the disengaging pressure surface means is lower in the neutral rest position of the working piston means than the pressure of said other working pressure chamber means.

9. A servo-motor according to claim 1, with a gear chamber means of the working cylinder means for the gearing connection of the working piston means with an adjusting shaft, said gear chamber means substantially pressure-relieved and being disposed opposite to the end wall having said opening, the gear chamber means being partitioned off pressure-tight with respect to the working pressure chamber disposed opposite to the end wall having said opening by a partition wall which cooperates with the working piston means and is substantially fixed relative to the working cylinder means, said gear chamber means being sealed off with respect to the other working pressure chamber by the sealing sleeve means, characterized in that the pressure relief surface means of the reducing ring piston means is located in the gear chamber means which also forms said relief pressure chamber means.

10. A pressure medium servo-motor according to claim 1, wherein said working piston means includes gear means for applying turning forces to a vehicle turning shaft.

11. A pressure medium servo-motor according to claim 10, wherein said working pressure chambers are communicated with a slide valve operable in response to turning of a turning shaft connected to said gear means.

12. A pressure medium servo-motor according to claim 11, wherein said second working pressure chamber is communicated with a high pressure reservoir and said first working pressure chamber is communicated with a lower pressure medium, the reducing piston disengaging surface being disposed in said first working pressure chamber.

13. A pressure medium servo-motor according to claim 1, wherein said reducing piston means exhibits a pressure-disengaging surface means for effectively reducing the pressure surface area of said working piston means when said working piston means is moved in said first direction.

14. A pressure medium servo-motor according to claim 13, wherein one end face of said reducing piston means is acted on by the pressure medium in said first pressure chamber and the other end face of said reducing piston means is acted on by a relief pressure in a relief pressure chamber means separate from said first and second pressure chambers.

15. A pressure medium servo-motor according to claim 14, characterized in that the reducing piston means is arranged in a relatively movable and pressure-tight manner with respect to the working piston means and the sealing sleeve means.

16. A pressure medium servo-motor according to claim 15, characterized by abutment means and corresponding counter-abutment means for supporting the reducing piston means in an essentially immovable manner with respect to the working piston means when the working piston means is moved in said first direction toward said first working pressure chamber from the rest position of the working piston means to reduce the volume of said first working pressure chamber.

17. A pressure medium servo-motor according to claim 16, wherein further abutment means and corresponding counter-abutment means are provided for supporting the reducing piston means in an essentially immovable manner with respect to the working cylinder means when the working piston means is moved in said second direction toward said second working pressure chamber from the rest position to reduce the volume of said second working pressure chamber.

18. A servo-motor according to claim 17, characterized in that the reducing piston means is an annular reducing piston means arranged essentially coaxially to the axis of the working piston means, an end face forming the pressure-disengaging surface means of the reducing piston means being disposed in the first working pressure chamber means, one of the cylindrical surfaces of the reducing piston means being sealed with respect to the working piston means and the other being sealed with respect to the sealing sleeve means.

19. A servo-motor according to claim 18, characterized in that the sum of the areas of the effective reduced first working piston pressure surface and the pressure disengaging surface is larger than a reference area of the reduced piston pressure surface means which would result in an equilibrium condition of the piston pressure forces in the neutral rest position of the working piston means.

20. A servo-motor according to claim 19, with said sealing sleeve means arranged in the interior space of the working cylinder means substantially coaxially to the axis of the working piston means, said sealing sleeve means having one end fixed in an essentially immovable manner at an end wall of the working cylinder means having an opening and which seals off said opening pressure-tight with respect to the working pressure chamber adjoining said end wall, characterized in that the disengaging pressure surface means is located in the working pressure chamber adjoining the end wall having the opening.

21. A servo-motor according to claim 20, characterized in that said end wall is formed by a housing end cover.

22. A servo-motor according to claim 20, characterized in that the disengaging pressure surface means actuatable by the pressure of the first working pressure chamber and the piston pressure surface of the working piston means actuatable by the pressure of the second working pressure chamber include portions spaced from one another in the radial direction of the axis of the working piston means.

23. A servo-motor according to claim 22, characterized in that the pressure in said first working pressure chamber actuating the disengaging pressure surface means is lower in the neutral rest position of the working piston means than the pressure of said second working pressure chamber.

24. A servo-motor according to claim 23, with a gear chamber means of the working cylinder means for the gearing connection of the working piston means with an adjusting shaft, said gear chamber means being substantially pressure-relieved and being disposed opposite to the end wall having said opening, the gear chamber means being partitioned off pressure-tight with respect to the working pressure chamber disposed opposite to the end wall having said opening by a partition wall which cooperates with the working piston means and is substantially fixed relative to the working cylinder means, said gear chamber means being sealed off with respect to the other working pressure chamber by the sealing sleeve means, characterized in that the pressure relief surface means of the reducing ring piston means is located in the gear chamber means which also forms said relief pressure chamber means.

* * * * *